United States Patent [19]

Sarver

[11] Patent Number: 5,418,714
[45] Date of Patent: May 23, 1995

[54] METHOD AND APPARATUS FOR VARIABLE BLOCK SIZE INTERPOLATIVE CODING OF IMAGES

[75] Inventor: Edwin J. Sarver, Pearland, Tex.

[73] Assignee: Eyesys Laboratories, Inc., Houston, Tex.

[21] Appl. No.: 44,401

[22] Filed: Apr. 8, 1993

[51] Int. Cl.⁶ ............................................. G06F 15/42
[52] U.S. Cl. ............................ 364/413.13; 364/413.18
[58] Field of Search ...................... 364/413.16, 413.18, 364/413.13, 413.15; 351/212, 221

[56] References Cited

U.S. PATENT DOCUMENTS

| | | | |
|---|---|---|---|
| 4,669,466 | 6/1987 | L'Esperance | 364/413.13 |
| 4,692,003 | 9/1987 | Adachi et al. | 351/212 |
| 4,721,379 | 1/1988 | L'Esperance | 351/212 |
| 5,307,096 | 4/1994 | Baroth et al. | 351/212 |

Primary Examiner—Donald E. McElheny, Jr.
Attorney, Agent, or Firm—Arnold, White & Durkee

[57] ABSTRACT

The method and apparatus of the present invention presents an apparatus and method for block adaptive image compression. The method and apparatus of the present invention reduces data storage and transmission requirements by sending a subset of the entire pixel data set existing in an image pixel data set. The pixels that are stored are referred to as primary pixels. The remaining pixels that are not transmitted or stored are referred to as secondary pixels. These secondary pixels are estimated from the primary pixels. A high fidelity image can be reproduced utilizing only the primary pixels. The method and apparatus of the present inventions estimates the secondary pixel values from the primary pixel values by predicting that a secondary pixel will look like the surrounding primary pixels, or by interpolating a value for the secondary pixels by summing the surrounding primary pixels and averaging them to obtain a value for the secondary pixel.

18 Claims, 14 Drawing Sheets

Microfiche Appendix Included
(31 Microfiche, 1 Pages)

8 X 8 BLOCK

| x/y | | 1 | 2 | 3 | 4 | 5 | 6 | 7 | 8 |
|---|---|---|---|---|---|---|---|---|---|
| 8 | 0 | 1.0<br>62 | 2.0<br>54 | 3.0<br>38 | 4.0<br>19 | 3.0<br>37 | 2.0<br>53 | 1.0<br>61 | 0 |
| 7 | | 1.4<br>57 | 2.2<br>46 | 3.2<br>30 | 4.1<br>15 | 3.2<br>29 | 2.2<br>45 | 1.4<br>56 | 1.0<br>60 |
| 6 | | 2.2<br>47 | 2.8<br>41 | 3.6<br>22 | 4.5<br>7 | 3.6<br>21 | 2.8<br>40 | 2.2<br>44 | 2.0<br>52 |
| 5 | | 3.2<br>31 | 3.6<br>23 | 4.2<br>12 | 5.0<br>3 | 4.2<br>11 | 3.6<br>20 | 3.2<br>28 | 3.0<br>36 |
| 4 | | 4.1<br>16 | 4.5<br>8 | 5.0<br>4 | 5.7<br>1 | 5.0<br>2 | 4.5<br>6 | 4.1<br>14 | 4.0<br>18 |
| 3 | | 3.2<br>32 | 3.6<br>24 | 4.2<br>13 | 5.0<br>5 | 4.2<br>10 | 3.6<br>27 | 3.2<br>35 | 3.0<br>39 |
| 2 | | 2.2<br>48 | 2.8<br>42 | 3.6<br>25 | 4.5<br>9 | 3.6<br>26 | 2.8<br>43 | 2.2<br>51 | 2.0<br>55 |
| 1 | | 1.4<br>58 | 2.2<br>49 | 3.2<br>33 | 4.1<br>17 | 3.2<br>34 | 2.2<br>50 | 1.4<br>59 | 1.0<br>63 |
| | 0 | | | | | | | | 0 |

4 X 4 BLOCK

| x/y | | 1 | 2 | 3 | 4 |
|---|---|---|---|---|---|
| 4 | 0 | 1.0<br>14 | 2.0<br>7 | 1.0<br>13 | 0 |
| 3 | | 1.4<br>9 | 2.2<br>3 | 1.4<br>8 | 1.0<br>12 |
| 2 | | 2.2<br>4 | 2.8<br>1 | 2.2<br>2 | 2.0<br>6 |
| 1 | | 1.4<br>10 | 2.2<br>5 | 1.4<br>11 | 1.0<br>15 |
| | 0 | | | | 0 |

2 X 2 BLOCK

| x/y | | 1 | 2 |
|---|---|---|---|
| 2 | 0 | 1.0<br>2 | 0 |
| 1 | | 1.4<br>3 | 1.0<br>1 |
| | 0 | | 0 |

FIGURE 8

1st stack: 256,256,8

| Quantizer Selection | Threshold Value |
|---|---|
| 0 | 4 |
| 1 | 6 |
| 2 | 9 |
| 3 | 12 |
| 4 | 15 |
| 5 | 16 |
| 6 | 20 |

| Image | Quantizer Selection | Compression Ratio | SNR (dB) |
|---|---|---|---|
| Eye | 0 | 3.35 | 40.74 |
| | 1 | 4.36 | 37.84 |
| | 2 | 6.53 | 36.69 |
| | 3 | 9.70 | 35.45 |
| | 4 | 13.08 | 34.29 |
| | 5 | 14.80 | 32.93 |
| | 6 | 20.31 | 31.78 |
| Lenna | 0 | 2.38 | 33.96 |
| | 1 | 3.09 | 32.91 |
| | 2 | 4.51 | 32.52 |
| | 3 | 6.26 | 31.89 |
| | 4 | 8.02 | 31.23 |
| | 5 | 9.18 | 30.60 |
| | 6 | 11.75 | 29.89 |
| Jet | 0 | 3.34 | 30.95 |
| | 1 | 4.39 | 30.49 |
| | 2 | 6.05 | 30.23 |
| | 3 | 7.44 | 29.91 |
| | 4 | 8.56 | 29.61 |
| | 5 | 9.60 | 29.17 |
| | 6 | 11.26 | 28.83 |
| Tiffany | 0 | 2.26 | 29.70 |
| | 1 | 2.88 | 29.27 |
| | 2 | 3.97 | 29.09 |
| | 3 | 5.38 | 28.79 |
| | 4 | 6.80 | 28.43 |
| | 5 | 7.66 | 28.09 |
| | 6 | 9.97 | 27.66 |

FIGURE 11A

| Image | Quantizer Selection | Compression Ratio | PSNR (dB) |
|---|---|---|---|
| Lake | 0 | 1.73 | 40.40 |
| | 1 | 2.06 | 36.60 |
| | 2 | 2.39 | 36.01 |
| | 3 | 2.85 | 34.83 |
| | 4 | 3.43 | 33.53 |
| | 5 | 3.91 | 32.17 |
| | 6 | 4.98 | 30.96 |
| Baboon | 0 | 1.47 | 32.12 |
| | 1 | 1.67 | 31.34 |
| | 2 | 1.79 | 31.22 |
| | 3 | 1.93 | 30.95 |
| | 4 | 2.07 | 30.53 |
| | 5 | 2.32 | 29.71 |
| | 6 | 2.56 | 29.06 |
| Vegetables | 0 | 2.10 | 40.37 |
| | 1 | 2.68 | 36.84 |
| | 2 | 3.76 | 35.96 |
| | 3 | 5.37 | 34.58 |
| | 4 | 7.34 | 33.36 |
| | 5 | 8.39 | 32.43 |
| | 6 | 11.47 | 31.40 |

FIGURE 11B

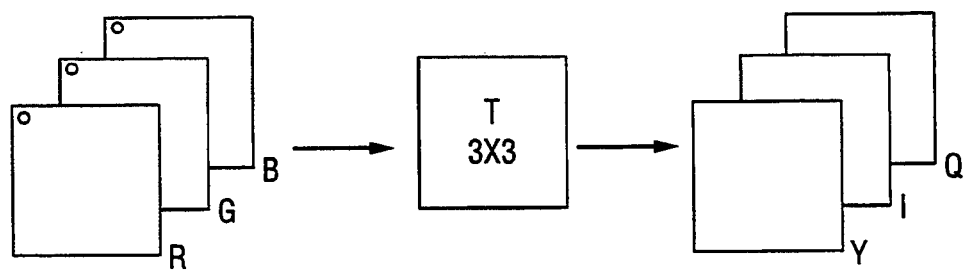
FIGURE 12A
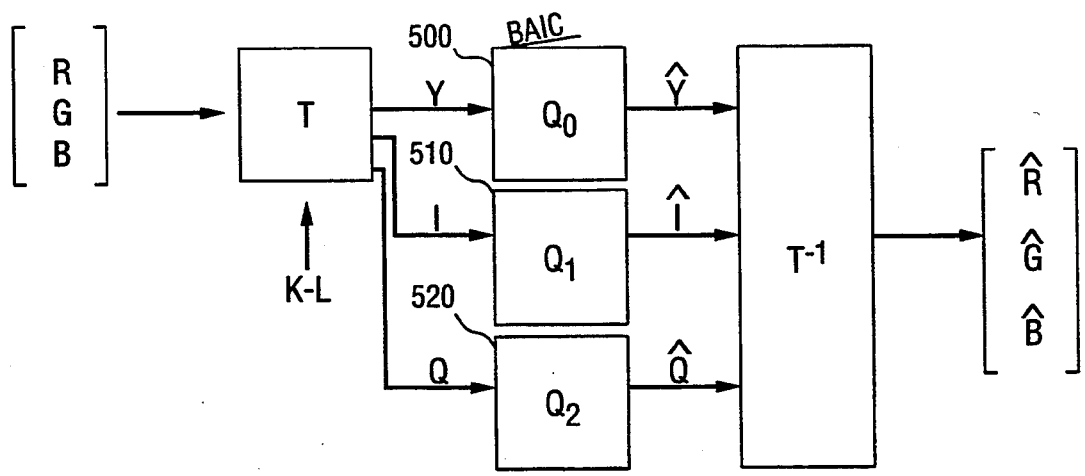
FIGURE 12B
FIGURE 12C

METHOD AND APPARATUS FOR VARIABLE BLOCK SIZE INTERPOLATIVE CODING OF IMAGES

SOFTWARE MICROFICHE APPENDIX

A microfiche software appendix consisting of 1 fiche comprising 31 frames is included.

TRADEMARK NOTIFICATION

EyeSys, Corneal Analysis System (CAS) and EyeSys Laboratories are trademarks utilized by EyeSys Laboratories, Inc. of Houston, Tex. Federal registration of these trademarks is pending.

COPYRIGHT NOTIFICATION

Pursuant to 37 CFR 1.71 (d) the following copyright notice is provided: A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED PATENT APPLICATIONS

This patent application is related to U.S. Ser. No. 08/044,654 filed concurrently herewith, entitled a "Method and Apparatus for Lossless Compression of Correlated Data Utilizing Delta Coding with Conditional Runlengths" by Edwin J. Sarver, and assigned to EyeSys Laboratories, Inc., which is herein incorporated by reference. This patent application is also related to U.S. Ser. No. 07/607,640 filed Oct. 29, 1990, abandoned, entitled a "Multi-functional Corneal Analysis System" by Wakil, D'Souza, Baumgartner, and Carbonari and assigned to EyeSys Laboratories, Inc., which is herein incorporated by reference. This patent application is also related to U.S. Ser. No. 07/817,868, entitled "A Contact Lens Sculpturing Device" by Wakil, D'Souza, Baumgartner, and Carbonari and assigned to EyeSys Laboratories, Inc. (abandoned divisional application of abandoned Ser. No. 607,640 filed Jan,. 7, 1992) which is herein incorporated by reference; U.S. Ser. No. 07/818,659, entitled "A Method of Using A Placido" by Wakil, D'Souza, Baumgartner, and Carbonari and assigned to EyeSys Laboratories, Inc. (abandoned divisional application of abandoned Ser. No. 607,640 filed Jan. 7, 1992) which is herein incorporated by reference; and abandoned U.S. Ser. No. 07/819,364, and "A Placido Apparatus" by Wakil, D'Souza, Baumgartner, and Carbonari and assigned to EyeSys Laboratories, Inc. (abandoned divisional application of abandoned Ser. No. 607,640 filed Jan. 7, 1992) which is herein incorporated by reference.

This patent application is also related to the patent application entitled, "VIDEO TO PRINTER INTERFACE METHOD AND APPARATUS" by Edwin J. Sarver, Henry M. D'Souza, and Steven Woo, Ser. No. 07/866,675, filed on Apr. 10, 1992. This patent application is also related to the design patent application Ser. No. 07/867,795 entitled "DESIGN FOR AN ABSOLUTE DIOPTRIC SCALE REPRESENTATION" filed on Apr. 10, 1992 by Edwin J. Sarver and assigned to EyeSys Laboratories, Inc. which is herein incorporated by reference; and this patent application is also related to the patent application Ser. No. 07/973,045, entitled "A Method and Apparatus for Obtaining Keratometric Data," by E, Sarver, H. D'Souza, S. Woo, D. Engler, and K. Carbonari, filed on Nov. 6, 1992, and assigned to EyeSys, Inc. herein incorporated by reference,

FIELD OF THE INVENTION

The present invention relates generally to data compression and more specifically to adaptive compression and encoding of image data.

BACKGROUND OF THE INVENTION

Image compression is desirable in image data processing due to the size of the images. A typical image can include over 250,000 bytes of data. Thus, it would require a great deal of disk space to store several of these images in their uncompressed state. Data transfer is slow as well for such large data files. Thus it is desirable to reduce the amount of data to a minimum to save disk space and reduce data transfer time.

Typically, in most compression algorithms that are based on block sizes, a single block size is utilized for the entire image. A single block size is undesirable in some cases. For example, in some images, large portions of the image picture elements (pixels) may be of approximately the same intensity, forming a homogeneous region within the image. In this case a large block size is desirable. A single intensity value can be assigned to the entire homogenous pixel region. The block can be as large as the homogenous region without loss of accuracy or efficiency in the data representation.

Many images, however, are not composed of large homogeneous regions. When the image data is not homogeneous, a smaller block size is desirable. For example, when the image has a large quantity of detail, such as an image of trees or grass, or at a hair line, smaller blocks are desirable. In these nonhomogeneous regions, it is not practical to represent large areas of the image with a single pixel value. Thus it is desirable to utilize a large number of smaller blocks to define the detail present in the nonhomogeneous regions. Thus there is a need for a block size that varies in accordance with the amount of detail encountered in the image.

SUMMARY OF THE INVENTION

The method and apparatus of the present invention presents an apparatus and method for block adaptive image compression. The method and apparatus of the present invention reduces data storage and transmission requirements by sending a subset of the entire pixel data set existing in an image pixel data set. The pixels that are stored are referred to as primary pixels. The remaining pixels that are not transmitted or stored are referred to as secondary pixels. These secondary pixels are estimated from the primary pixels. A high fidelity image can be reproduced utilizing only the primary pixels. The method and apparatus of the present inventions estimates the secondary pixel values from the primary pixel values by predicting that a secondary pixel will look like the surrounding primary pixels, or by interpolating a value for the secondary pixels by summing the surrounding primary pixels and averaging them to obtain a value for the secondary pixel.

The present invention provides a method and apparatus for analyzing corneal imagery data to diagnosis corneal conditions; measuring a physical characteristic of a cornea; converting the measured physical corneal characteristic to a digital image comprising a series of digital values; storing in a processor memory the digital values representing the physical characteristics of the cornea; selecting a region of digital values less than or equal to all of the digital values; determining a prediction error for the selected digital values; determining whether the prediction error exceeds a threshold value; selecting a different region of digital values when the prediction error exceeds the threshold; and analyzing the digital representation of the corneal imagery data. The present invention further provides a method and apparatus for adapting the number of bits utilized to represent the prediction error; adapting a quantizer width in accordance with the characteristics of the region; adapting a set of interpolation coefficients in accordance with the characteristics of the region.

The present invention provides a method and apparatus wherein the shape of region of pixels is adapted when the prediction error exceeds the threshold and the size region of pixels is adapted when the prediction exceeds the threshold wherein the region of pixels is a block of pixels wherein the block of pixels is subdivided into polygons when the prediction error exceeds the threshold.

The present invention further provides a method and apparatus for compressing; for determining which secondary pixel in a region of pixels is farthest away from a primary pixel; determining whether a value for the secondary pixel exceeds a threshold; and adapting the region of pixels if the threshold is exceeded.

BRIEF DESCRIPTION OF THE DRAWINGS

FIG. 8 is an illustration depicting the preferred pixel scanning order in the present example of a preferred embodiment.

FIGS. 11A and 11B are a table depicting the Signal to Noise Ratios (SNR) and Compression Ratio values for the USC benchmark images in the present example of a preferred embodiment.

FIGS. 12A–12C illustrates the transformation of the red, green and blue (RGB) components into YIQ space in the present example of a preferred embodiment.

DETAILED DESCRIPTION OF THE PREFERRED EMBODIMENT

Figure 1A:
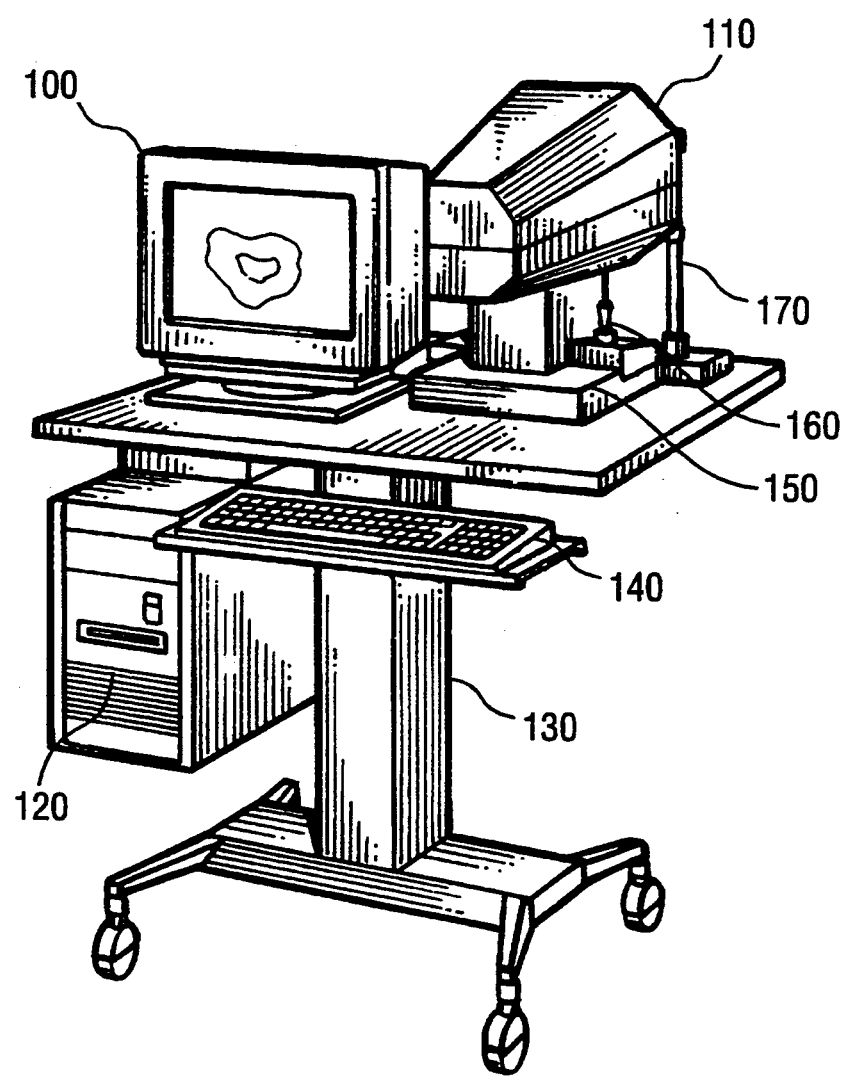
FIG. 1A is an example of a preferred hardware embodiment of the present invention.

The present invention will be further clarified by a consideration of the following examples, which are intended to be exemplary of the invention and the use of the invention and are not intended to limit the scope of the invention.

In the preferred embodiment, the block size is adaptively selected based on the characteristics of the image pixel data. Large blocks are used for homogeneous data. Smaller blocks are utilized for detailed data. An image is broken down into smaller and smaller sections until the error for any pixel in the block is less than a predetermined threshold, Te. The method and apparatus provides a technique that utilizes historical tendencies and interpolation of primary pixel data to predict the values for subsequent pixel data sets.

Thus, the prediction technique is both causal and noncausal. Causal pixel prediction utilizes the historic tendencies of the image data to predict the values for other pixel data. Noncausal prediction utilizes the primary pixels surrounding a secondary pixel to estimate a value for the secondary pixel. Noncausal prediction is essentially an interpolation methodology.

Causal prediction is useful in a homogeneous image region such as in a region of pixels existing on the side of a wedge. For example, when sampling pixel data in an uphill or downhill direction on the wedge surface, the pixel values have the same tendency. Thus, the method and apparatus of the preferred embodiment predicts that an unknown pixel value will continue the trend established by the surrounding pixels. The pixel data tendency is based on the historical values for the surrounding pixel data. Noncausal pixel prediction, or interpolation, utilizes the primary pixel data surrounding a secondary pixel to estimate the secondary pixel's value.

The pixel data encoder and reconstructor utilize the same prediction technique. Thus, rather than storing and transferring an entire pixel data set, only the prediction errors are stored and transferred. This technique reduces the amount of data, thus reducing data storage capacity and transmission bandwidth requirements.

The method and apparatus of the present invention is adaptable to variations in pixel region activity. Large block sizes with few data bits are utilized to encode pixel estimation errors in the homogeneous regions of pixel data where most of the data has the same value. Smaller blocks are utilized for nonhomogeneous regions which manifest a large quantity of detail. Correspondingly, a larger number of bits are utilized to encode the pixel estimation errors in the nonhomogeneous regions of an image. Thus, the block size and number of bits utilized to represent the prediction error are variable in accordance with the characteristics of the image data in a particular region, A threshold, Te is provided to control the compression rate and corresponding reconstruction error. As Te is allowed to increase, more error is tolerated, and the allowable data compression rate increases, There is a tradeoff, however, between the achievable data compression rate and the perceived image quality. If a high quality image is not necessary for image reconstruction and display, Te can be large and significant data compression is attainable. However, if high fidelity image reconstruction is desired, for example with an image containing fine detail, Te should be small and the achievable compression rate reduced. The user may select Te, thereby selecting the amount of error introduced into an pixel data set by controlling the thresholds. As explained above, the perceived image quality is inversely proportional to the allowed error threshold, Te.

The present invention presents a simple and effective image compression scheme. The preferred embodiment is implemented on a data processor with memory storage existing in the EyeSys Corneal Analysis System (CAS) TM manufactured by EyeSys Laboratories, Inc. of Houston, Tex. In the preferred embodiment, the method and apparatus of the present invention is used to compress corneal eye images in the EyeSys Corneal Analysis System(CAS) TM where compression rates of 3:1 to 40:1 are routinely obtained.

The corneal images are derived from a Charge Coupled Device camera and compressed before storing them in system memory. The preferred method and apparatus also yields good image quality on a set of benchmark images from the University of Southern California data set, which is the benchmark generally utilized for comparing compressed images.

In interpolative image compression a subset of pixels is selected for transmission and storage. See, A. N. Netravali and B. G. Haskell, Digital Pictures Representation and Compression, Plenum Press, N.Y., 1988. Interpolative image compression entails interpolating pixels within a subset of the entire pixel data set to encode and reconstruct the entire data set, and is well known in the art.

As an example, a brute force technique for performing interpolative image compression is to select every other pixel in each row and column for transmission and storage. The missing pixels are reconstructed by interpolating the four pixels surrounding each missing pixel to estimate a value for the missing pixel. For example, the even pixels in each row and column, numbered: 0, 2, 4, etc., referred to as primary pixels, can be selected for transmission and storage. The odd numbered pixel values, numbered: 1, 3, 5, etc., referred to as secondary pixels, can be estimated by interpolating between the four primary pixel values surrounding each odd numbered secondary pixel. Therefore, there is no need to transmit or store the secondary pixel values.

This simple technique, achieves a 4 to 1 data compression rate, as only the even numbered primary pixels are transmitted and stored. A secondary pixel value can be estimated by a performing a simple summation of each of the four adjacent primary pixel values and dividing the sum by four. Secondary pixels located at the boundaries of the pixel region do not have four adjacent pixels. Thus, these boundary pixels can be estimated by taking one-half of the summation of the two adjacent primary pixels.

There are additional techniques which can be utilized to arrive at noncausal predictive values. One of these techniques is edge strength comparison. This technique selects stronger edges in estimating the missing secondary pixel values. An edge falling between two adjacent pixels is stronger or sharper than an edge diagonally traversing a pixel. Thus, the two pixels with the stronger edges will be utilized in interpolation to estimate a value for the missing secondary pixel. Edge strength determination is a nonlinear adaption technique which facilitates preservation of sharp edges existing in the image data.

Edge preservation is important in the preferred embodiment. In the preferred embodiment, a concentric set of Placido rings is reflected off of a patient's cornea. A Charge Coupled Device camera captures the image of the cornea and the reflected Placido rings. The image data comprises a corneal image with an embedded set of concentric rings generated by the reflection of the Placido rings off of the corneal surface.

A perfectly spherical cornea reflects a perfectly concentric set of Placido rings. An nonspherical corneal reflects a nonconcentric set of Placido rings. The nonspherical characteristics of the cornea can be determined by examining the degree of perturbation away from concentric for the reflected Placido rings. An edge detector is utilized to find the edges of the rings and compute their location.

The edges of the reflected rings are utilized to determine the topography of the cornea. The EyeSys Corneal Analysis System (CAS) of the preferred embodiment utilizes the resulting corneal topography to diagnose problems with the eye. Thus, it is desirable to maintain sharp edges during data compression to facilitate processing of the Placido rings. Therefore, it is desirable to utilize primary pixels with strong edges, such as those pixels aligned with an edge, thus helping to preserve the edges of the Placido ring for edge detection and processing. The strength of a pixel edge is determined by computing the differential or size of the step gradient between pixels, which is proportional to the edge strength. The stronger edge pixels are preferably selected for primary pixels utilized for interpolation.

The primary pixel data set may be further compressed to achieve a compression ratio higher than four to one. Primary pixels are highly correlated, therefore, they may be compressed utilizing a common compression technique such as Pulse Code Modulation (PCM) or quantization, Differential Pulse Code Modulation (DPCM) by determining and storing only the differences between the sequential pixel values, vector quantization by finding vectors to represent primary pixels, or transform coding (TC) to transform the pixels into another space which decorrelates the correlation between the pixels into the fewest possible coefficients.

Only the primary pixels need be transmitted or stored. The remaining secondary pixels, which are not included in the primary pixel data set, are reconstructed by interpolation of the primary pixels at the reconstructor. Thus, the secondary pixels which are necessary to reconstruct the image, are not transmitted because they can be recreated by interpolation of the primary pixel data set. A residual error block is formed by subtracting the predicted primary pixels and the interpolated block of secondary pixels from the original image block. The residual error block can be determined for each block size utilized. This residual error block may be further compressed using Transform Coding, which is well known in the art. (See, for example, B. G. Haskell, "Interpolative, Predictive and Pyramid Transform Coding of Color Images", Proceedings of IEEE ICASSP 88, pp. 785-787, April 1988), or vector quantization (see, e.g., H. M. Hang and B. G. Haskell, "Interpolative Vector Quantization of Color Images", IEEE Trans, on Comm., vol. 36, no. 4, pp. 465-470, April 1988).

Interpolative image compression schemes are useful in both interframe and intraframe applications in the preferred embodiment. Thus, the method and apparatus of the present invention works well across a single image, or across a time sequence of images such as animation or video frames. Decorrelation is useful to represent the image with the smallest dynamic range required. The method and apparatus of the present invention decorrelates pixels in the temporal domain as well.

Referring now to FIG. 1A, a hardware embodiment for the example of a preferred embodiment is illustrated. FIG. 1A illustrates a Corneal Analysis System(-CAS) TM, manufactured by EyeSys Laboratories, Inc., 2776 Bingle, Houston, Tex., (713) 465-1921. The Corneal Analysis System comprises a corneal image analysis viewing monitor 100, a backlit, conical placido projector 110, a computer with associated memory and hardware devices 120, a stand 130, a keyboard 140, a movable placido/CCD camera stand 150, a joystick 160 for positioning the placido relative to a patient's corneas, and a patient positioning head rest 170. In the present example of a preferred embodiment, a physician utilizes the method and apparatus of the present invention in conjunction with the Corneal Analysis System(-CAS) TM or an equivalent system. The physician captures an image of the patient's cornea by positioning the patient in front of the placido projector/CCD camera 110. The CAS takes a picture of the placido reflected off of the cornea. The CAS digitizes the image and stores in computer memory 120. The image is compressed and then stored in computer memory 120 for diagnosis at a later time, transmitted over a network to another CAS or some other system for diagnosis at a remote location, or displayed for immediate diagnosis on diagnostic display screen 100.

Figure 1B:
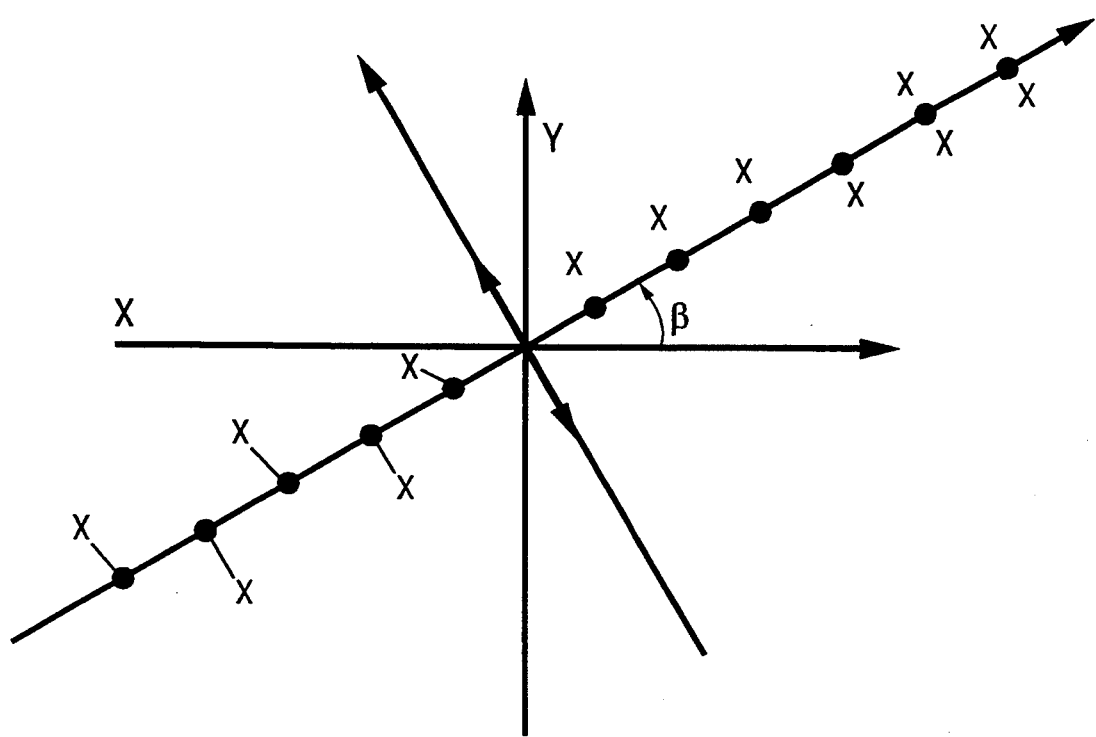
FIG. 1B is a graph showing axis rotation in linear space in the present example of a preferred embodiment.

For example, in a two dimensional example, as shown in FIG. 1B, by rotating the axes in linear space with a two by two matrix, it can be shown that most of the signal energy is contained in one dimension. Thus a one dimensional representation can be used to represent all of the data points. Very little signal energy is required in the other dimension and is thus negligible in the representation. Rotation can be performed for a plurality of dimensions until the signal energy is so small that it is negligible and is no longer necessary to accurately represent the image. Thus, as shown in FIG. 1B, to represent a pattern or random vector in two space, by rotating the axes by an angle theta, the values can be represented along a single axis rotated by the angle theta. The axis can then be rotated back to its original position through an angle theta without significant loss of fidelity in the data representation. Moreover, this technique can be extended to N dimensions.

In the preferred embodiment, an improved compression technique, which yields good image reconstruction results in compression rates in the range of 1.0 bit per pixel. The preferred embodiment combines adaptive prediction and interpolation methods followed by adaptive Huffman coding. The preferred embodiment also employs variable block sizes to provide additional adaptability. The combination of methods used in the preferred embodiment is refereed to as Block Adaptive Interpolative Coding (BAIC). The preferred embodiment provides a simple technique for achieving good results and reasonable data rates. The simple technique makes it easy to implement and maintain in software. The simple implementation lends itself to a reduced-complexity, less-costly implementation in hardware as well.

Figure 2:
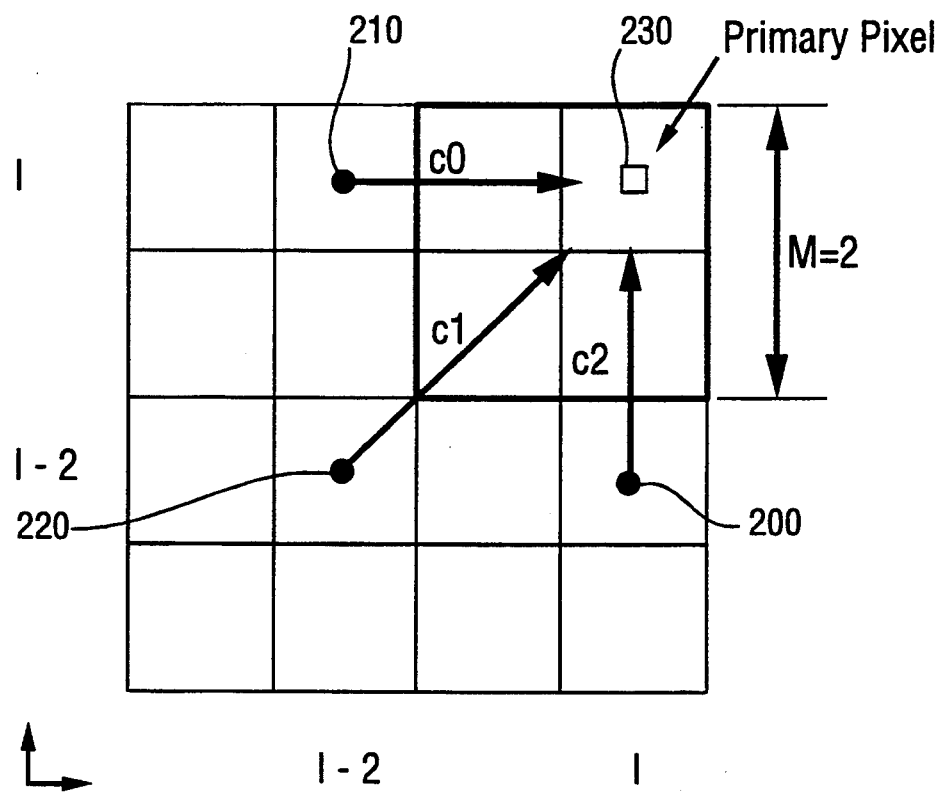
FIG. 2 is an example of block division and pixel prediction in the present example of a preferred embodiment.

Turning now to FIG. 2, for example, BAIC can divide an image into M×M pixel blocks and use selected pixels from neighboring blocks to predict a pixel value for the current block under consideration. Neighboring blocks contain primary pixels 200, 210, and 220, which have already been computed. The present embodiment forms a linear combination of neighboring pixels utilizing equation 1, shown below.

The preferred embodiment determines coefficients c0, c1, and c2. Assuming that the image is highly correlated, the minimum-mean-squared predictor, from a statistical point of view, will set coefficients c0 and c2 equal to 1, and coefficient c1 equal to $-1$. Assuming that these are the values for the coefficients, no multiplications are required. The coefficient based computation requires only addition and subtraction to determine the predicted pixel value. Thus the calculations are faster and easier to implement.

The preferred embodiment is considerably faster than predicting a pixel based optimal least-squares coefficients. A linear system of coefficients will have a matrix which is positive, semi-definite, but a solution that may not be useful. In the degenerate case, assuming that the image is highly correlated, the technique of the preferred embodiment enables the system to overcome the few cases in which the coefficients are not useful. Assuming that the least-squares prediction is desired, a deterministic system of normal equations exists which will always have a solution, except where the matrix is singular. The few degenerate cases will remain where the coefficients are not useful, but assuming that the coefficients are 1, $-1$, and 1, the technique yields a useful solution which is 90% as efficient as an optimal technique, without having to deal with degenerate cases.

Figure 3:
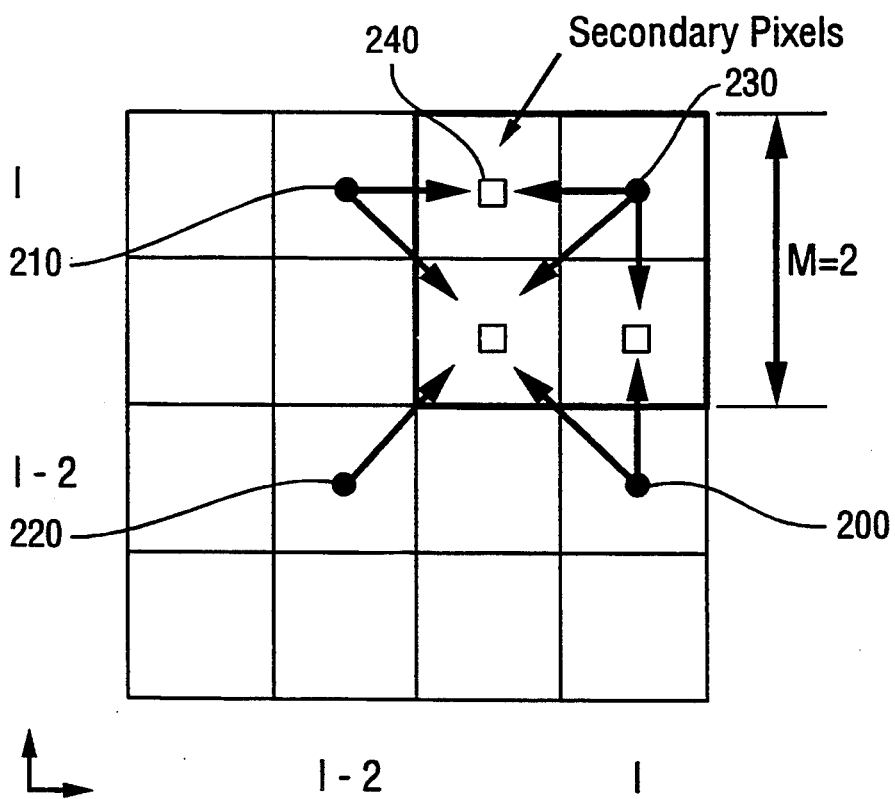
FIG. 3 is an example of block division and pixel prediction in the present example of a preferred embodiment.

In the preferred embodiment, the method and apparatus of the present invention can interpolate the remaining M×M−1 pixels of the block using the predicted pixels from neighboring blocks, as shown in FIG. 3. Once the primary pixels are determined, an interior secondary pixel 240 can be determined. As discussed above, secondary pixels can be determined by linear interpolation or by assigning coefficients and solving optimal equations to determine optimal prediction coefficients, as utilized in adaptive DPCM prediction of the primary pixels. Equations 2 and 3 are used in the interpolation, which is a linear interpolation of the pixel values.

The residual error for the block is computed and compared to a threshold value, Te. The interpolated pixels are then subtracted from the original image block and the computed difference for each pixel compared with a threshold value, Te. If the difference between the interpolated pixel value and the original pixel value, referred to as a residual error, is greater than Te, the block size is changed. In one example of the preferred embodiment, the image block is divided into four smaller blocks and the process of interpolation and residual error calculation repeats for each subblock. The most general case is to allow the blocks to be subdivided into rectangular regions.

Alternatively, the blocks can be subdivided into arbitrary contours. The contours selected are represented by contour codes. The contours may be selected to be coextensive with homogeneous regions. If a block is subdivided until it reaches the minimum block size of 1×1, i.e. a single pixel, but the residual error still exceeds the threshold, Te, the pixel value is explicitly encoded and provided to the reconstructor since no further block reduction is possible. Explicit encoding is common in an image with a high degree of detail, such as scenes containing imagery of grass and trees.

In the preferred embodiment, the method and apparatus of the present invention starts with 8×8 block of pixels and attempts to encode the pixels. If there are pixels in the block that exceed the predefined threshold, Te, the preferred method and apparatus repeatedly subdivides the region until the error is reduced below Te or the block size is reduced to 1×1 and the pixel is encoded directly. The user may indirectly set the threshold, Te. The initial block size and threshold are set by the Corneal Analysis System processor. The user can override the initial selection by selecting a quantizer style ranging from zero-six. A selection of zero represents no compression. Thus the pixels are directly encoded. A selection of one represents a small block size, for example 2×2, and a small threshold, Te, so that a high fidelity image can be reconstructed which looks very much like the original image. At a quantizer selection of six, a large 8×8 block is utilized, and the threshold, Te is large. In this case wider quantizers are utilized capable of achieving compressions on the order of 30 to 1.

Figure 4:
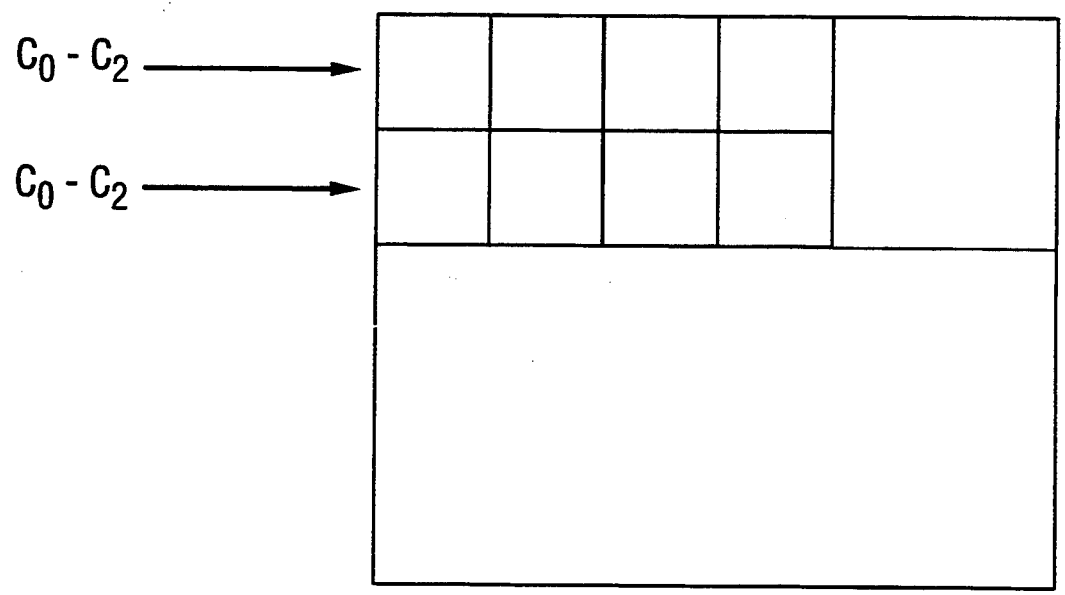
FIG. 4 is an example adaptive coefficient generation in the present example of a preferred embodiment.

Turning now to FIG. 4, in the preferred embodiment, coding of the primary pixels is adaptive in the sense that the prediction coefficients, $c_i$, may be recalculated and transmitted for each image or image region. For example, on a row by row basis, as shown in FIG. 4, row 0 has coefficients $c_0$-$c_2$, which are used for the first row. On the second row, the data has a different characteristic and another set of coefficients is utilized. Thus, the coefficients vary in accordance with the characteristics of the data. For example, in an image of the horizon, the upper rows of the image, contain an image of the sky, which contains highly correlated image data. The lower part of the image, however, contains grass and trees, and is not highly correlated. Thus, a different set of coefficients may be utilized for the bottom half of the image to accommodate the uncorrelated data. Thus, the coefficients may be adapted based on the characteristics of the image data within a region.

Primary pixels may also be computed adaptively at both the encoder and the reconstructor. After coding each block, statistics are maintained such as standard deviations and mean values in terms of the prediction values. Alternatively, recursive-least-squares, a deterministic technique, can be utilized, although the computation may not be cost effective unless half of the image is highly uncorrelated and the other half is highly correlated, as in the example of the horizon as mentioned above. Alternatively, the computed prediction error standard deviation can be used to adapt the quantizer levels for a Laplacian primary pixel quantizer. Thus, the prediction error may be quantized as well. This technique is not utilized in the preferred embodiment as is not necessary to represent the corneal image with sufficient accuracy. The preferred embodiment utilizes a uniform quantizer with adaptive Huffman coding of the values, As shown in FIG. 2, a primary pixel in the current M×M size block can be predicted from three neighboring pixels according to equation 1.

$$x(i,j) = c_0 x(i-M,j) + c_1 x(-M,J-M) + c_2 x(i,j-M) \quad (1)$$

Figure 5:
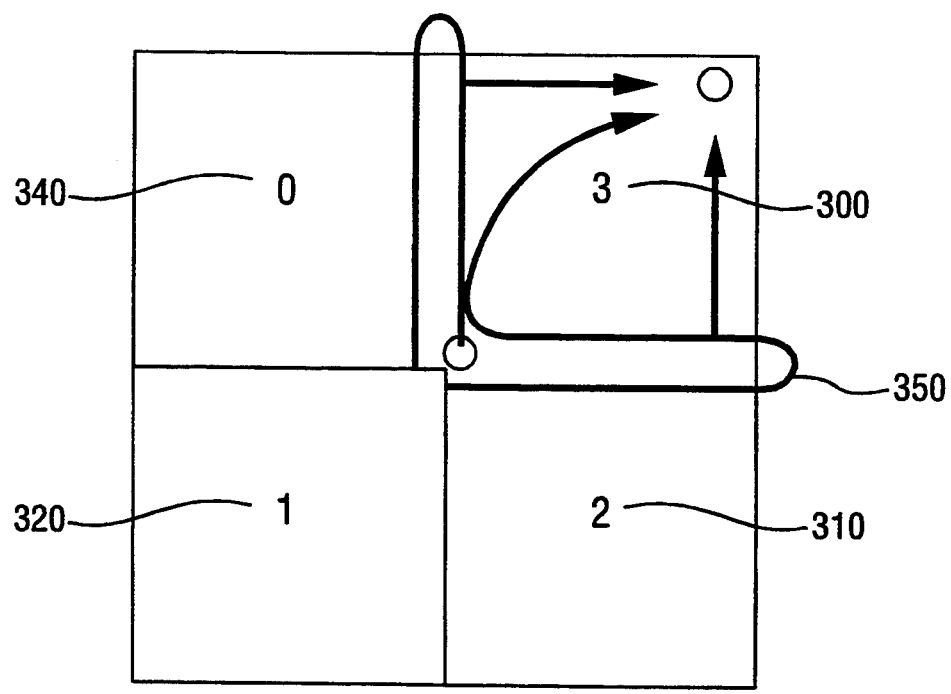
FIG. 5 is an example of a preferred embodiment of pixel prediction utilizing a plurality of border pixels.

Alternatively, as shown in FIG. 5, a technique utilizing the entire border, can be utilized which produces less prediction error, but at the expense of more computational overhead. For example, in FIG. 5, blocks 340, 320, and 310 are already encoded, and are utilized to encode block 300. A vector 350 consisting of pixels completely surrounding the causal border around block 300 can be utilized. A vector combination of all these pixels would enable the system to predict the primary pixels with less error. However, although the predicted value is more accurate than the value obtained by utilizing only 3 pixels, the improved accuracy is insufficient to warrant the increased computational overhead in the preferred embodiment.

In ADPCM, the pixel value $x(i,j)$ is computed during compression but only the prediction error is transmitted. (See, e.g., P. A. Maragos, R. W. Schafer, and R. M. Mersereau, "Two-Dimensional Linear Prediction and its Application to Adaptive Prediction Coding of Images", IEEE Trans. on ASSP, vol. 32, no. 4, pp. 1213-1229, December 1984). During reconstruction, the same prediction technique is utilized. The prediction error is then added to the predicted value to arrive at the final pixel intensity for the primary pixel. The linear prediction coefficients, $c_i$, may be computed in a number of ways, which includes both stochastic and deterministic models. In the preferred embodiment, the coefficients are set to 1, −1, and 1.

In the preferred embodiment, the prediction error is quantized and may be further compressed using, for example, Huffman or arithmetic coding. The preferred embodiment utilizes a simple odd-length uniform quantizer to vary the width of quantization based on the block size. By using an odd-length quantizer, the system can reconstruct zero exactly, to avoid granularity noise around 0, and can use a remaining code, assuming $2^b$ bit words, for a flag. The use of this flag will be explained below.

Discrete data are often highly redundant and are therefore wasteful of transmission bandwidth or storage space. For example, a data stream consisting of the values 5,5,5,5,5,7 does not require more than 2 bits to represent the data stream. Bit zero can be used to represent the value 5 and bit one used to represent the value 7. Thus to reduce the redundancy, a coding technique may be utilized. This is true of the preferred quantizer prediction error values and flag codes. For example, allowing a quantizer to utilize three bits, allows the quantizer to represent 8 codes. Seven of these quantizer codes are utilized to represent the prediction error values and the last value is utilized as a flag code.

A lossless data compression code can be employed to represent the data more efficiently. Compression codes make use of models of the source data to be encoded. The models provide information about the probabilities of the source data. A model can be static, dynamic, or adaptive.

Figure 6:
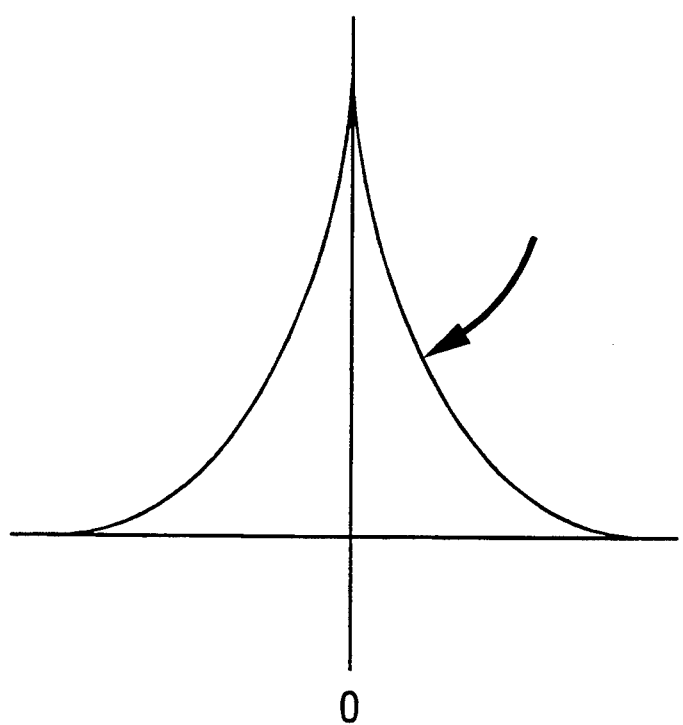
FIG. 6 is a graph of the expected pixel error envelope in the present example of a preferred embodiment.

A static model derives statistics from a representative sample of the data. The performance of the encoder depends upon how well the source data matches the statistics of the representative data. Both the encoder and decoder are provided with the static model which does not change during processing. For example, referring now to FIG. 6, the image is assumed to manifest a prediction error in accordance with a histogram that indicates the probability of occurrence of an error of a given size, As shown in FIG. 6, the expected error envelope is Laplacian, a decaying exponential which falls off by the standard deviation about the average error, which is zero. But even in a static model, one would have to guess the standard deviation to determine the fall off of the probability function. Thus, this technique is not utilized in the preferred embodiment.

A dynamic model utilizes a two-pass technique which first computes the statistics for the source data, then utilizes these statistics to encode and compress the data. The statistics together with the compressed data are transmitted to the decoder. This technique is slower because of the computational overhead required by a two-pass technique.

The preferred adaptive model, however, utilizes a single-pass technique, which continues to update its own model, for example a histogram, as it makes a single pass through the image. An adaptive model relies upon the preceding pixel data values to estimate the statistics of the source data. In general, the adaptive technique is less accurate than the dynamic model, because the dynamic model is two-pass and knows the data values ahead of time. The preferred adaptive model, however, does not incur the computational overhead of a second pass through the data because it is a one-pass technique. Both the encoder and decoder utilize the same adaptation algorithm so that no table of statistics need be communicated between them, as required in the two-pass dynamic model.

The preferred embodiment utilizes a one-pass adaptive model in combination with Huffman coding. In Huffman coding, short codes are assigned to values which occur most frequently, and longer codes are assigned to values which occur less frequently. Thus, the overall data length is reduced because the code that occurs most often utilizes only one bit.

Preferably, histograms are collected based on the block size. As the block sizes changes, a new Huffman code is computed for the new block size. The statistics for the new block size, which indicate the error and the error flag, may change drastically between block sizes, depending on the desired end result. For example, if the system is utilizing an 8×8 block, but the user does not want any error induced in the reconstructed image, the error flag indicating that the block size should be reduced will occur frequently. Thus, the code to represent the error flag occurs frequently, and will be represented by one bit for the 8×8 block size. For smaller block sizes, however, this will not necessarily be true. Moreover, when the block size is reduced to 1×1, then the reduce block flag should not be encoded at all since a smaller block is not available. Thus, it is preferable to adapt the statistics based on the block size.

Figure 7A:
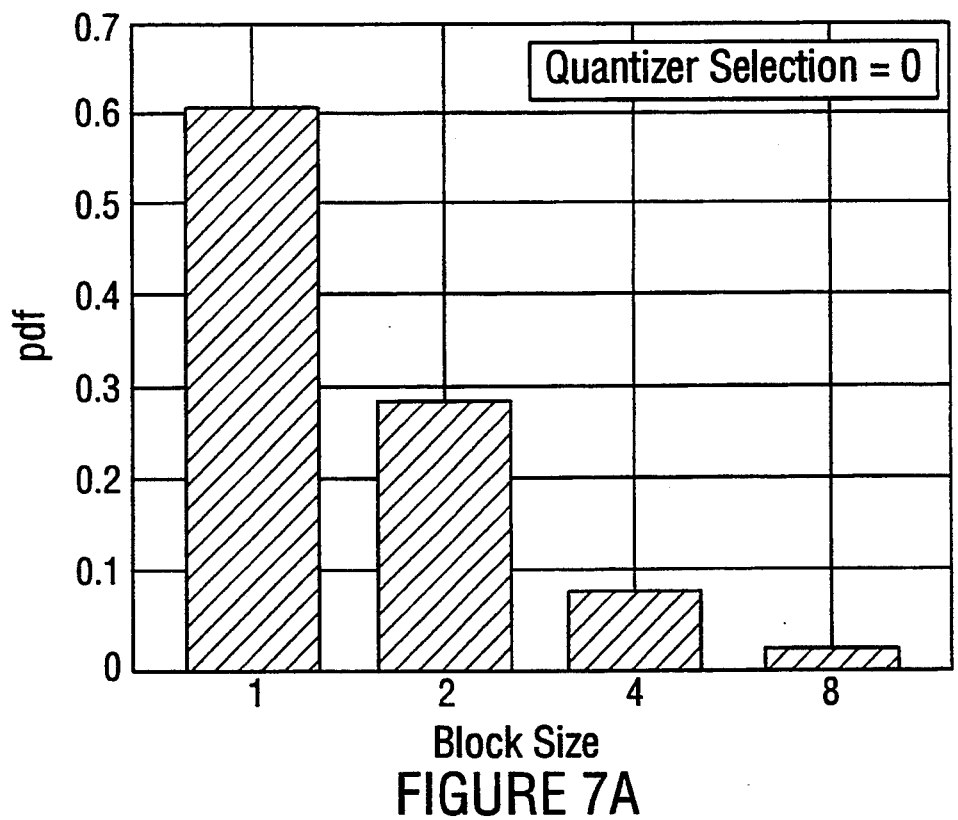
FIG. 7A–7G are representative histograms collected for a series of images which illustrates the occurrence of block sizes for different quantizer selections in the present example of a preferred embodiment.
Figure 7B:
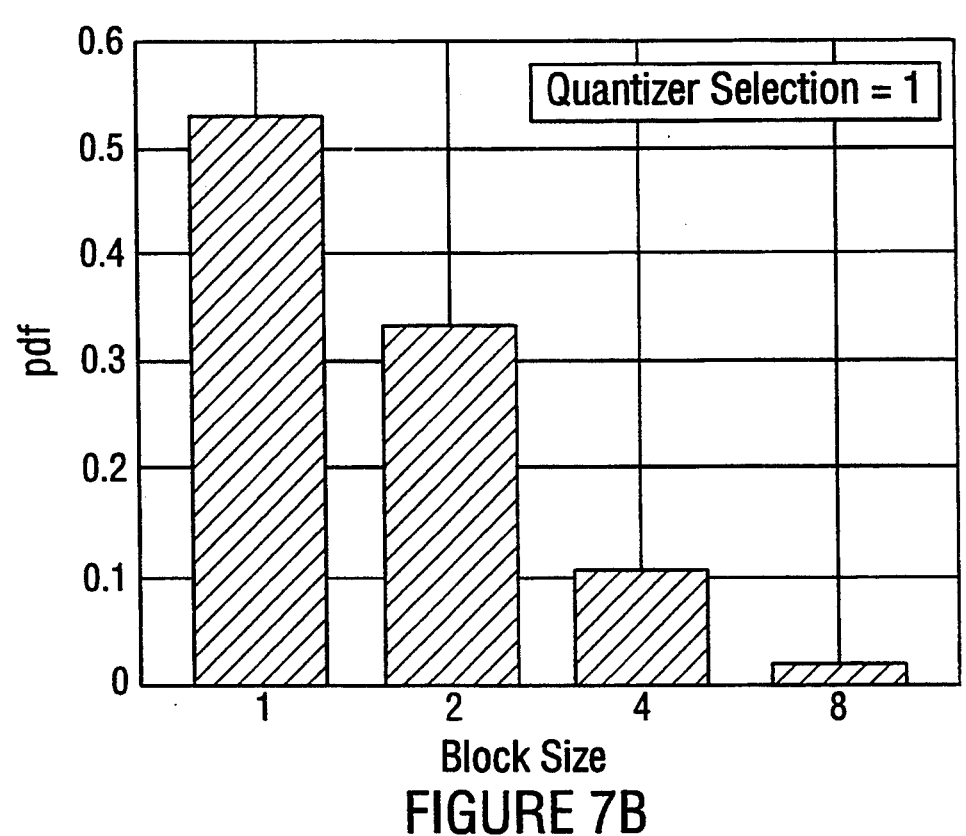
Figure 7C:
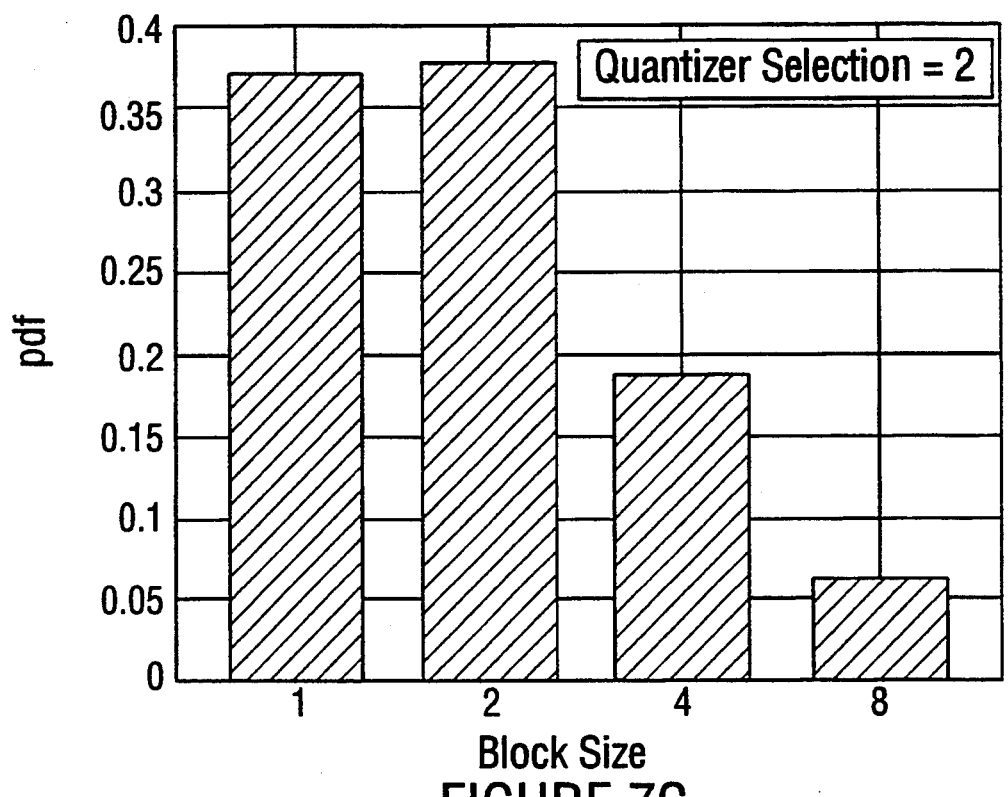
Figure 7D:
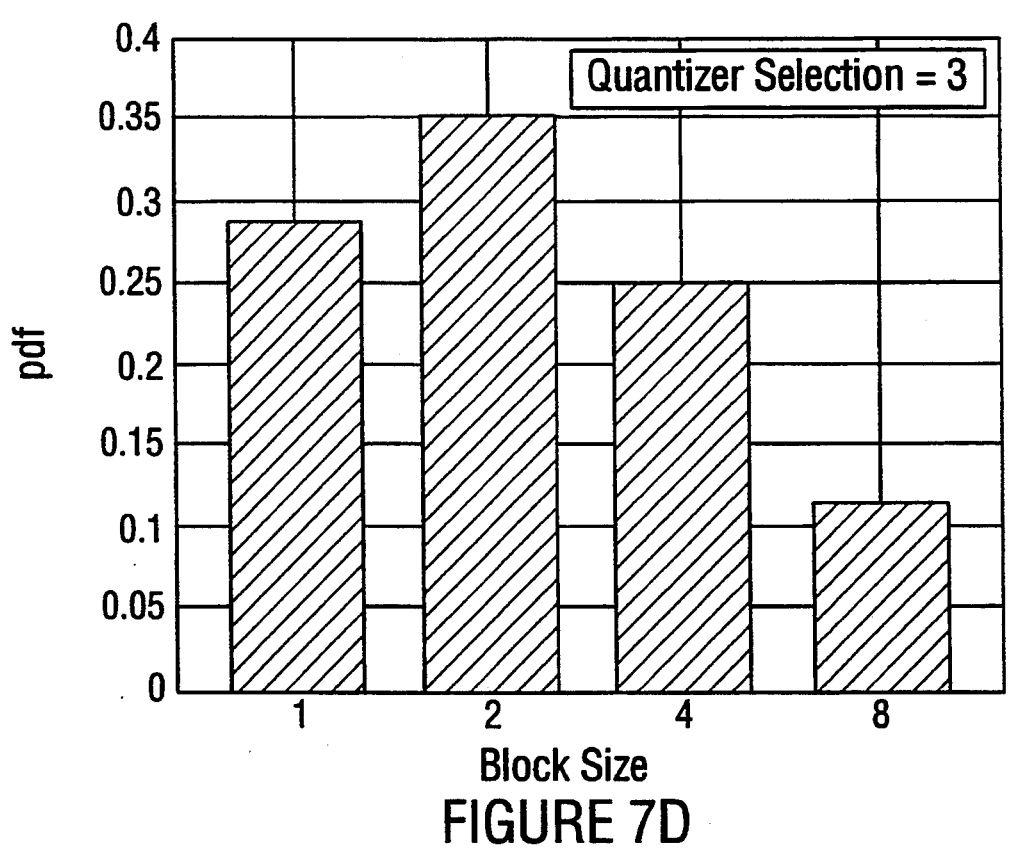
Figure 7E:
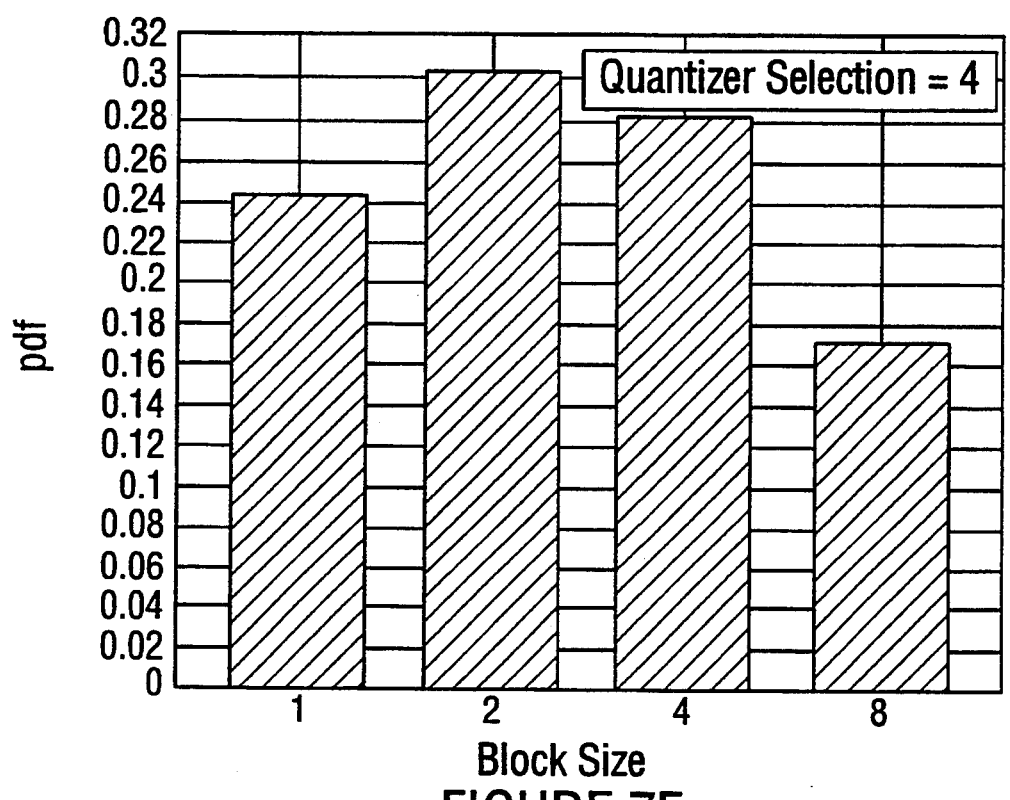
Figure 7F:
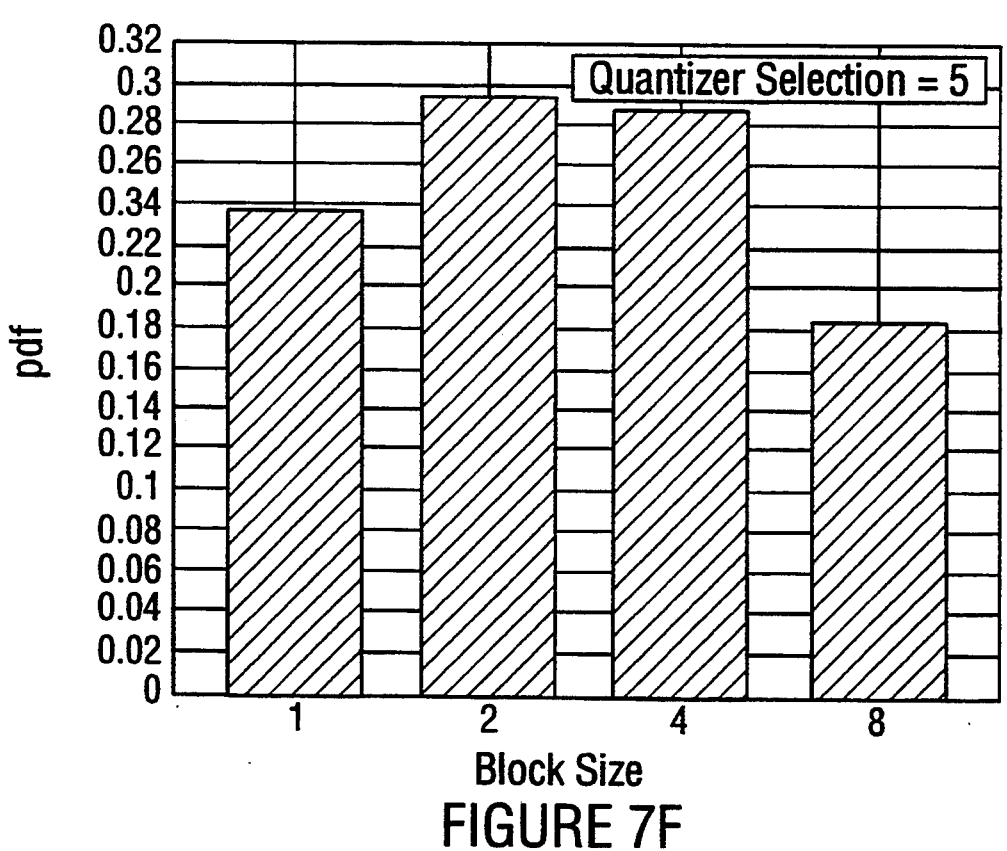
Figure 7G:
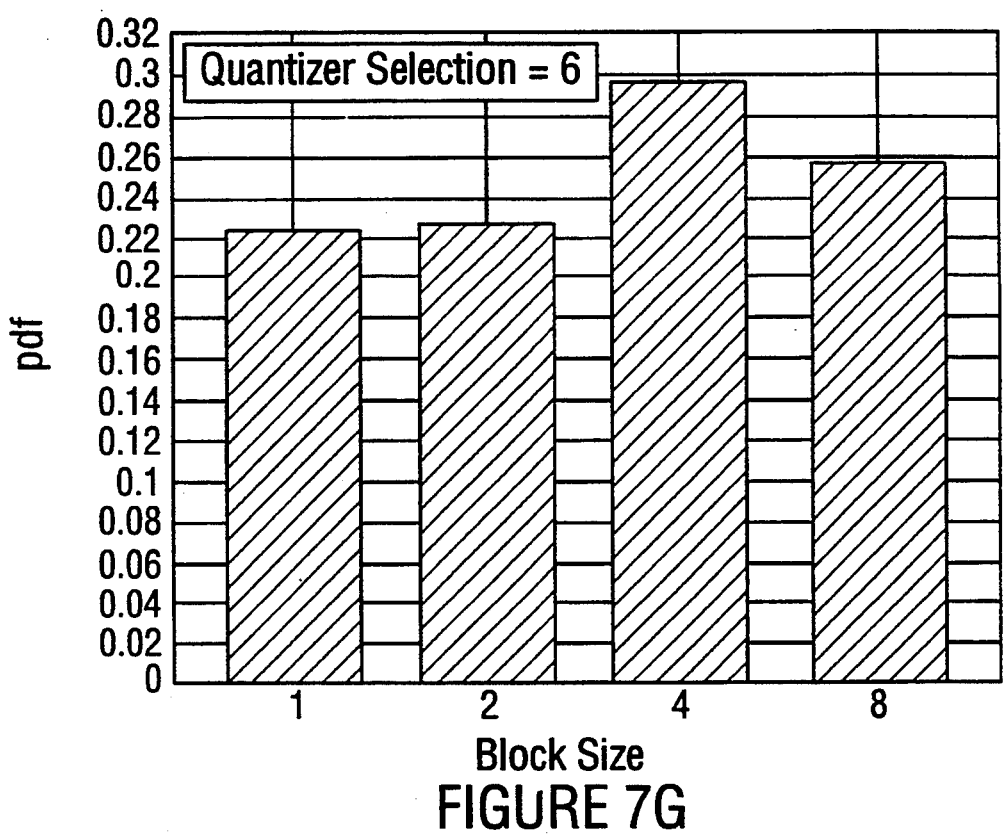

Turning now to FIGS. 7A–7G, representative histograms collected for a series of images is shown. FIG. 7A shows the block sizes that tend to occur when the quantizer size selection is set to zero. As shown, when the quantizer selection is zero, block size 8×8 occurs infrequently, but the smaller block sizes occur frequently. As shown in FIGS. 7A–7B, as the selected quantizer size increases, the number of occurrences of larger block sizes increases. From these histograms the system computes the entropy of the image data and compares it with the number of bits required to code the errors and the error flags without compression. Additional compression is preferred, although it adds computational overhead associated with Huffman encoding. In the preferred embodiment, entropy infers a measure of the average information in the present signals.

Interpolation of Secondary Pixels

Turning again to FIG. 3, in the preferred embodiment, once the primary pixel, x(i,j) has been computed by adding the prediction error to the quantizer prediction error, the secondary pixels are then interpolated from the primary pixels using a bilinear interpolation. FIG. 3 illustrates this procedure for block size, M=2. In general, the interpolated pixels are obtained as in equation 2.

$$x(i - n_1, j - n_2) = A + \frac{n_2}{M} [B - A] \quad (2)$$

where $$A = x(i,j) + \frac{n_1}{M} [x(i - M,j) - x(i,j - M)] \quad (3)$$

$$B = x(i,j - M) + \frac{n_1}{M} [x(i - M,j - M) - x(i,j - M)]$$

Other interpolation techniques may be employed to obtain secondary pixels form primary pixels. For example, adaptive interpolation may be quite useful for some types of images in order to better preserve the edges occurring in the image data. In adaptive interpolation, the differences x(i−M,j)−x(i,j−M) and x(i,j−x(i−M,j−M) are compared. The pair of pixels with the smallest difference is used to interpolate the center pixel(s). An alternative interpolation technique is to determine the optimal linear coefficients as utilized for the primary pixels.

The difference between the interpolated pixel and the original pixel need not be provided to the reconstructor. In general, most functions are interpolated reasonably well for small neighborhoods of pixels, but extrapolate poorly. In the preferred embodiment, prediction is actually an extrapolation because the predicted pixel is outside of the region of pixels used to predict it. Interpolated pixels are generally bounded by pixels including the current primary pixel for the block, which has the error already added back in. Thus, in homogenous areas of the image, the surrounding pixels are sufficient to interpolate the missing secondary pixels in between the existing primary pixels. In the detailed high energy areas of an image, the interpolated pixels will not be well represented. In this case, the interpolation error is undesirably large and the block size is reduced.

Thus, the basic difference between primary and secondary pixels is that primary pixels are predicted and accompanied by the prediction error, but interpolated pixels are interpolated with no further information provided to the reconstructor by the encoder. If the difference between an interpolated pixel (non-causal prediction) and the original pixel exceeds a threshold, Te, the block size is reduced.

If any of the interpolated pixels yield an error which exceeds the threshold, Te, the preferred method and apparatus subdivides the pixel block into four smaller blocks. In an alternative embodiment, the block is divided into arbitrary contours represented by contour codes. Ideally, an arbitrary contour is coextensive with a homogeneous region. To reduce computational overhead, it is preferable to determine as quickly as possible if block subdivision will be required. Since images are normally highly correlated, the error for an interpolated pixel nearest to one of the primary pixels is less likely to exceed the error threshold, than another pixel farther away from the primary pixel.

The remote pixel, located farther away from the primary pixel, is more likely to produce an error that will exceed Te. The preferred embodiment takes advantage of this probability by first interpolating the error for the worst case pixel farthest away from the primary pixel. Pixel location is determined and encoded into an array, as a distance from a primary pixel, as shown in FIG. 8. In FIG. 8, the top number in each cell of the array represents the distance from the interpolated pixel cell to the nearest primary pixel. The bottom number in each cell represents the order in which the pixels are scanned and interpolated. For example, as shown in FIG. 8, for the 8×8 block, the first pixel scanned and interpolated is at location, 4,4 in the center of the 8×8 pixel block. Its distance from the closest primary pixel is 5.7 pixels away, as indicated by the top number in cell 4,4 shown in FIG. 8. The bottom number in cell 4,4 is 1. This indicates that pixel location 4,4 is the first pixel that will be interpolated in the present block, since it is farthest from the primary pixel and thus most likely to generate an error greater than Te requiring reduction of the block size.

Thus, the system determines quickly after a single interpolation whether to finish interpolating the entire pixel block, or whether the error will exceed Te and the block will have to be subdivided. Using this scanning order provided in the array, instead of the typical raster scan order, the average number of interpolated pixels which must be evaluated before the error threshold, Tp, is exceeded is reduced, so that the corresponding computation time is reduced. In the preferred embodiment, a 30% computation time reduction is achieved.

Adaptive Block Sizes and the Flag Codes

If the reconstruction error for the predicted primary pixel exceeds the threshold Tp, or an error in a secondary (interpolated) pixel would exceed a threshold Ts, a flag code is stored to indicate that the block size should be reduced. If the block size has been reduced to the minimum 1×1 and the error threshold is still exceeded, the flag code is stored along with the exact pixel value.

Error calculation and pixel block adaptation

Figures 9, 10:
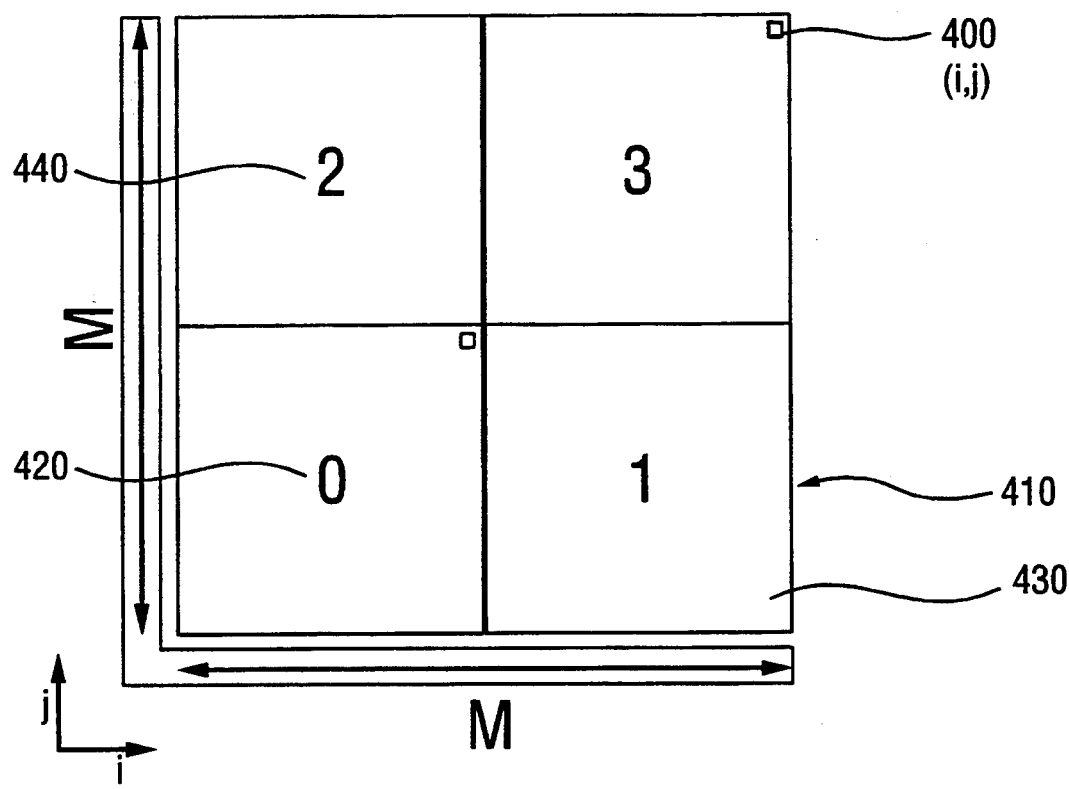
FIG. 9 is an illustration depicting error calculation and pixel block adaption in the present example of a preferred embodiment.
FIG. 10 is an example of the preferred thresholds for several quantizer selections in the present example of a preferred embodiment.

Referring now to FIG. 9, the preferred embodiment maintains a stack of pixel block origins and sizes at both the compressor encoder and reconstructor. The operation of the stack during compression is as follows: The primary pixel 400 address is i,j and the block 410 size is M. M is 8,8 for an 8×8 block and the pixel is located somewhere in the middle of the block. Thus, before entering the routine to examine the block, the system first pushes the location of the pixel to be examined onto the stack. Thus, while the stack is nonzero, the system pops the first item from the stack. The block prediction error or flag is also popped from the stack. The preferred method and apparatus of the present invention then determines if it can code the block without exceeding the error threshold. If it can, then the code for the particular quantization error is returned. If any code other than the flag code is returned, the preferred method and apparatus determines that it is finished with the block and looks on the stack for another item to examine.

If however, a code seven, the reduce block flag is returned, the block is subdivided. This is accomplished by pushing the four quadrants 400, 420, 430 and 440 of the block onto the stack, in a specific order to maintain the causal aspect of the predictor. In the preferred embodiment, the method and apparatus of the present invention pushes the quadrants in order: 0, 1, 2, 3. This order is preferred because, if the system tries to push the address and size for block 3, it will try to interpolate using the primary pixels for blocks 0, 1, and 2, which have not been computed. Thus, the system begins with block 0 where the surrounding edge pixels already exist so that they may be utilized in interpolation.

Given the address of the primary pixel and the block size, the method and apparatus of the present invention compresses the pixel block using adaptive block sizes. The functional steps are executed as follows:
0. Initialize the stack Push i, j, and M
1. Loop while the stack is non-zero If stack is empty, stop. Pop row, col, size from stack
2. Get block prediction error or flag return, Huffman encode it, and update the event histogram for adaptive coding. k=CodeBlock(i,j,M) Encode symbol k. Increment eventhist(log2(M),k)
3. Sub-divide the block if required. If k not="flag code" then go to step 1 if M=1 then go to step 4 Set M=M/2 Push i,j,M Push i,j−M,M Push i−M,j,M Push i−M,j−M,M Go to step 1
4. Single pixel will not compress, send its value Output x(i,j) Go to step 1

The preferred method and apparatus of the present invention performs well with corneal image data. An example of the preferred thresholds is shown in FIG. 10. The preferred method and apparatus has been applied these same seven threshold combinations as shown in FIG. 5 to the 512×512 monochrome images Lenna, Jet, Tiffany, Lake, Baboon and Vegetables from the USC library as benchmark images.

The Signal to Noise Ratios (SNR) and Compression Ratio values for these USC benchmark images are shown in FIGS. 11A and 11B. The higher signal to noise ratios indicate a high quality image.

BAIC for Color Images

The method and apparatus of the present invention, developed for monochrome image compression, can be easily adapted to color image compression. A brute force method for implementing color compression utilizes monochrome image compression on all three planes of the color image. Preferably, the method and apparatus of the present invention first transforms the color image to another domain, preferably, YIQ, where the image energy is unequally distributed. The YIQ domain comprises the luminance plane Y, and the chrominance planes I and Q.

Referring now to FIGS. 12A–12C, the red, green and blue (RGB) components, are transformed into YIQ space. The method and apparatus of the present invention then operates differently on each of the components. The RGB values are passed through matrix T, to generate YIQ. Y is encoded with the Y Quantizer 500, I is encoded with the I quantizer 510, and Q is encoded with the Y Quantizer 520. The YIQ quantizers, utilize the Block Adaptive Interpolation Coding method of the present invention, to reduce the number of bits required to encode and store the transformed pixel values.

The transformation is beneficial because the eye is most sensitive to the Y plane, which is also the plane that contains the most signal energy in a color image. Thus, the Y plane is encoded with the most bits. The Y plane will exhibit the highest fidelity reproduction image. The I and Q planes are encoded with less bits because the eye is less sensitive to the I and Q planes, and because the I and Q planes contain less information.

The YIQ transformation places most of the image energy in the luminance plane, the Y plane, and places much less energy in the chrominance planes, the I and Q planes. It is well known that the human visual system is less sensitive to chrominance errors than luminance errors, and thus, provides the motivation for applying decimation and interpolation techniques to the I and Q chrominance planes during color image compression. Typically, the I and Q places are filtered and sampled at a 4:1 rate in each direction prior to compression. A decimation rate as high as 8:1 in both directions has been suggested by some researchers. (See, for example, G. G. Langdon, Jr., "An Introduction to Arithmetic Coding", IBM J. Res. Develop., vol. 28, no. 2, pp. 135–149, March 1984). With the present invention, this data reduction rate is easily achieved. The main limitation is that no pre-filter is explicitly assumed and the post-filter is bilinear interpolation. The performance of the chrominance plane compression is improved by utilizing optimal pre- and post-filters as suggested by Malvar (see C. S. Kim, M. J. T. Smith, and R. M. Mersereau, "An Improved SBC/VQ Scheme for Color Image Coding Proceedings of IEEE ICASSP" 89, pp. 1941–1944, May 1989).

While a preferred embodiment has been described, it is intended to be purely exemplary and not to limit the scope of the invention.

What is claimed is:

1. A method for analyzing corneal imagery data to diagnosis corneal conditions comprising the steps of:
   (a) measuring a physical characteristic of a cornea;
   (b) converting the measured physical corneal characteristic to a digital image comprising a series of digital values;
   (c) storing in a processor memory the digital values representing the physical characteristics of the cornea;
   (d) selecting a region of digital values less than or equal to all of the digital values;
   (e) determining a prediction error for the selected digital values;
   (f) determining whether the prediction error exceeds a threshold value;
   (g) selecting a different region of digital values when the prediction error exceeds the threshold; and
   (h) analyzing the digital representation of the corneal imagery data.

2. The method of claim 1 further comprising the step of: adapting the number of bits utilized to represent the prediction error.

3. The method of claim 1 further comprising the step of: adapting a quantizer.

4. The method of claim 3 wherein the quantizer width is adapted in accordance with the characteristics of the region.

5. The method of claim 1 further comprising the step of: adapting a set of interpolation coefficients in accordance with the characteristics of the region.

6. The method of claim 1 wherein the shape of region of pixels is adapted when the prediction error exceeds the threshold.

7. The method of claim 1 wherein the size region of pixels is adapted when the prediction exceeds the threshold.

8. The method of claim 1 wherein the region of pixels is a block of pixels.

9. The method of claim 8 wherein the block of pixels is subdivided into polygons when the prediction error exceeds the threshold.

10. An apparatus for analyzing corneal imagery data to diagnosis corneal conditions comprising:
    (a) means for measuring a physical characteristic of a cornea;
    (b) means for converting the measured physical corneal characteristic to a digital image comprising a series of digital values;
    (c) means for storing in a processor memory the digital values representing the physical characteristics of the cornea;
    (d) means for selecting a region of digital values less than or equal to all of the digital values;
    (e) means for determining a prediction error for the selected digital values;
    (f) means for determining whether the prediction error exceeds a threshold value;
    (g) means for selecting a different region of digital values when the prediction error exceeds the threshold; and
    (j) means for analyzing the digital representation of the corneal imagery data.

11. The apparatus of claim 10 further comprising: means for adapting the number of bits utilized to represent the prediction error.

12. The apparatus of claim 10 further comprising: means for adapting a quantizer.

13. The apparatus of claim 12 wherein the quantizer width is adapted in accordance with the characteristics of the region.

14. The apparatus of claim 10 further comprising: means for adapting a set of interpolation coefficients in accordance with the characteristics of the region.

15. The apparatus of claim 10 wherein the shape of region of pixels is adapted when the prediction error exceeds the threshold.

16. The apparatus of claim 10 wherein the size region of pixels is adapted when the prediction exceeds the threshold.

17. The apparatus of claim 10 wherein the region of pixels is a block of pixels.

18. The apparatus of claim 17 wherein the block of pixels is subdivided into polygons when the prediction error exceeds the threshold.

* * * * *